Figure 1:
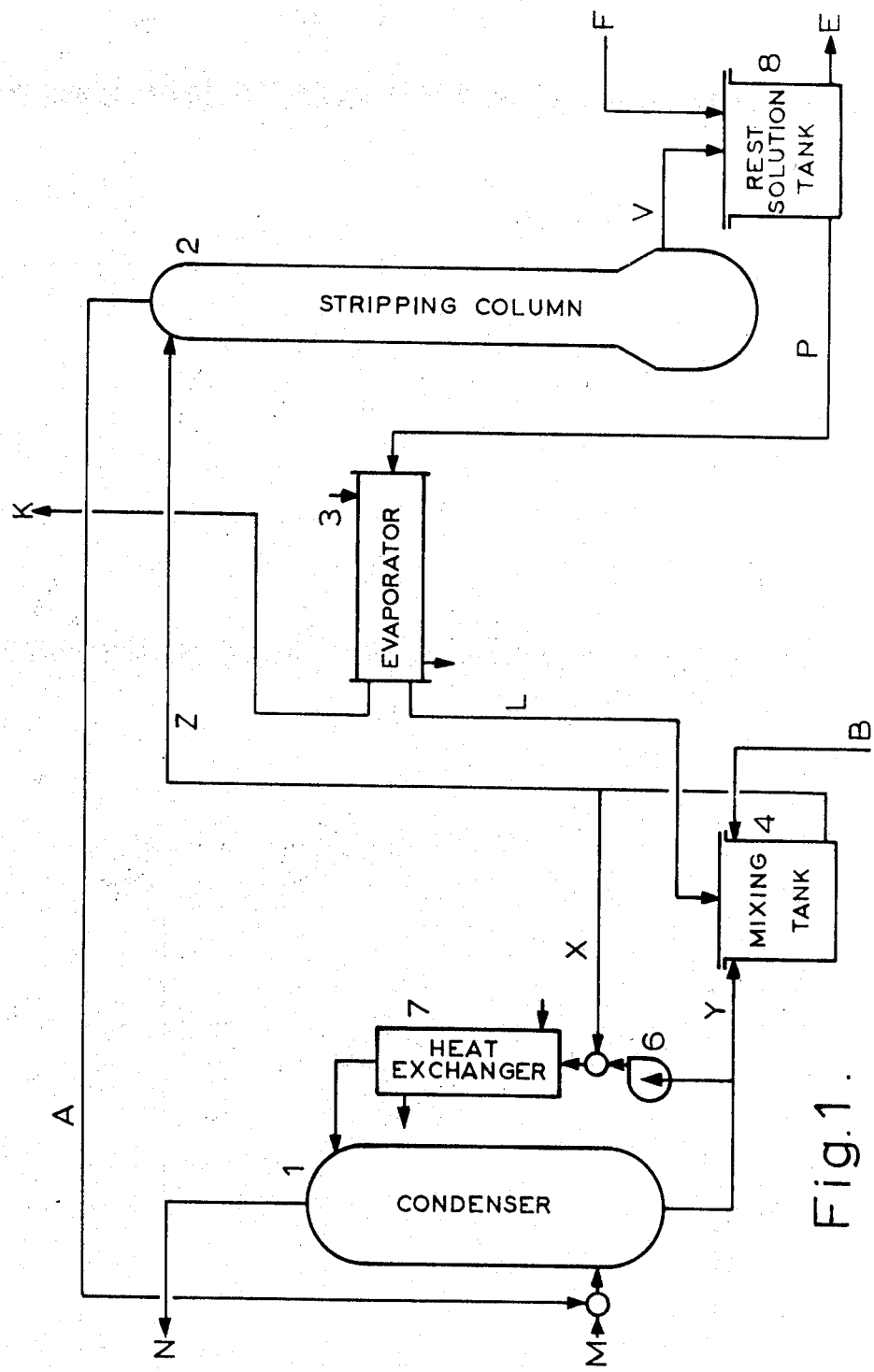

United States Patent [19]
Gudmundsen et al.

[11] 3,779,870
[45] Dec. 18, 1973

[54] RECOVERY OF ANHYDROUS HCL GAS BY EXTRACTIVE DISTILLATION WITH A HALIDE SALT

[75] Inventors: Sigmund Gudmundsen, Saetre I Hurum; Egil Ronaess, Porsgrunn; Sver Arne Kjolberg, Porsgrunn; Glor Thorvald Mejdell, Prosgrunn, all of Norway

[73] Assignee: Norsk Hydro A.S., Oslo, Norway

[22] Filed: July 19, 1971

[21] Appl. No.: 163,758

[30] Foreign Application Priority Data
July 17, 1970 Norway.............................. 2816/70

[52] U.S. Cl...................... 203/12, 203/42, 423/488, 423/498
[51] Int. Cl............................................. B01d 3/00
[58] Field of Search ............... 203/12, 42; 423/481, 423/488, 497, 498; 23/304, 300

[56] References Cited
UNITED STATES PATENTS
1,906,467  5/1933  Heath ............................ 203/12 X
3,394,056  7/1968  Nadler et al. ........................ 203/12
2,357,095  8/1944  Evans et al. .......................... 203/12

Primary Examiner—Norman Yudkoff
Assistant Examiner—David Edwards
Attorney—E. F. Wenderoth et al.

[57] ABSTRACT

A process for the recovery of substantially anhydrous HCl gas from hydrous HCl gas employing extraction distillation in the presence of one or more dissolved salts, characterized by a. directly contacting and cooling the aqueous HCl gas in a condenser (1) with a recirculating hydrochloric acid solution of a strength above that of the azeotropic composition, which solution may contain dissolved one or more chlorides suitable for increasing the ratio of the volatility of HCl to that of $H_2O$, and by withdrawing the desired dehydrated HCl gas from the condenser, b. distilling the condensed liquid from (a) in a stripping column (2) in the presence of at least 20 percent by weight of $MgCl_2$ (optionally, other suitable chlorides or mixtures of chlorides in an amount providing a similar ratio of volatility of HCl to that of $H_2O$), based on the mixture in the column, to strip off HCl, which preferably is recirculated to the process ahead of the condenser (1), c. evaporating the liquid effluent from (b) to remove water from the system, and at least partly returning the evaporated solution to the process.

9 Claims, 2 Drawing Figures

RECOVERY OF ANHYDROUS HCL GAS BY EXTRACTIVE DISTILLATION WITH A HALIDE SALT

The present invention relates to a process for the recovery of substantially anhydrous HCl gas from a hydrous HCl gas.

In the production of high percentage HCl gas from concentrated hydrochloric acid it is known to distill the hydrochloric acid in a column with the addition of a concentrated chloride solution, e.g., a solution of zinc chloride, calcium chloride or magnesium chloride, whereby the partial pressure of the water vapour and, consequently, the water content of outgoing HCl gas is reduced. In such an extraction distillation it is further known to add the concentrated salt solution in the upper part of the column while cooling, e.g., to room temperature.

The process of the invention in particular relates to the recovery of substantially anhydrous HCl gas from gases relatively rich in HCl, particularly from gases containing up to 20 percent by volume of $H_2O$, based on the total of $H_2O$ and HCl.

The process of the invention i.a. can be used in processing the moist HCl off-gas obtained when dehydrating magnesium chloride in a HCl atmosphere. When magnesium chloride hydrates are to be dehydrated substantially completely, the final stage of the dehydration must take place in a current of substantially dry HCl gas. Thus, on an industrial scale, e.g., in the production of magnesium chloride for the electrolytic production of magnesium, considerable amounts of hydrous HCl gas have to be dehydrated for recirculation to the chloride dehydration process. It is an advantage to use a HCl gas which is as dry as possible, because it is then easier to keep the content of hydrate and MgO of the product below the prescribed limits.

The process of the invention comprises (a) contacting in a condenser 1 the hydrous HCl gas directly with a cooling recirculating hydrochloric acid solution, the strength of which is above that of the azeotropic composition, in which solution there may be dissolved one or more chlorides suitable for increasing the ratio of the volatility of HCl to that of $H_2O$, withdrawing the desired dehydrated HCl gas from the condenser, (b) distilling the condensed liquid from (a) in a stripping column 2 in the presence of at least 20 percent by weight of $MgCl_2$ (optionally, other suitable chlorides or mixtures thereof in an amount providing a similar ratio between the volatilities of HCl and $H_2O$), based on the mixture in the column itself, to strip off HCl, which preferably is recirculated to the process ahead of the condenser 1, (c) evaporating the liquid effluent from (b) so as to remove water from the system, and returning the evaporated solution at least partly to the process.

Figure 2:
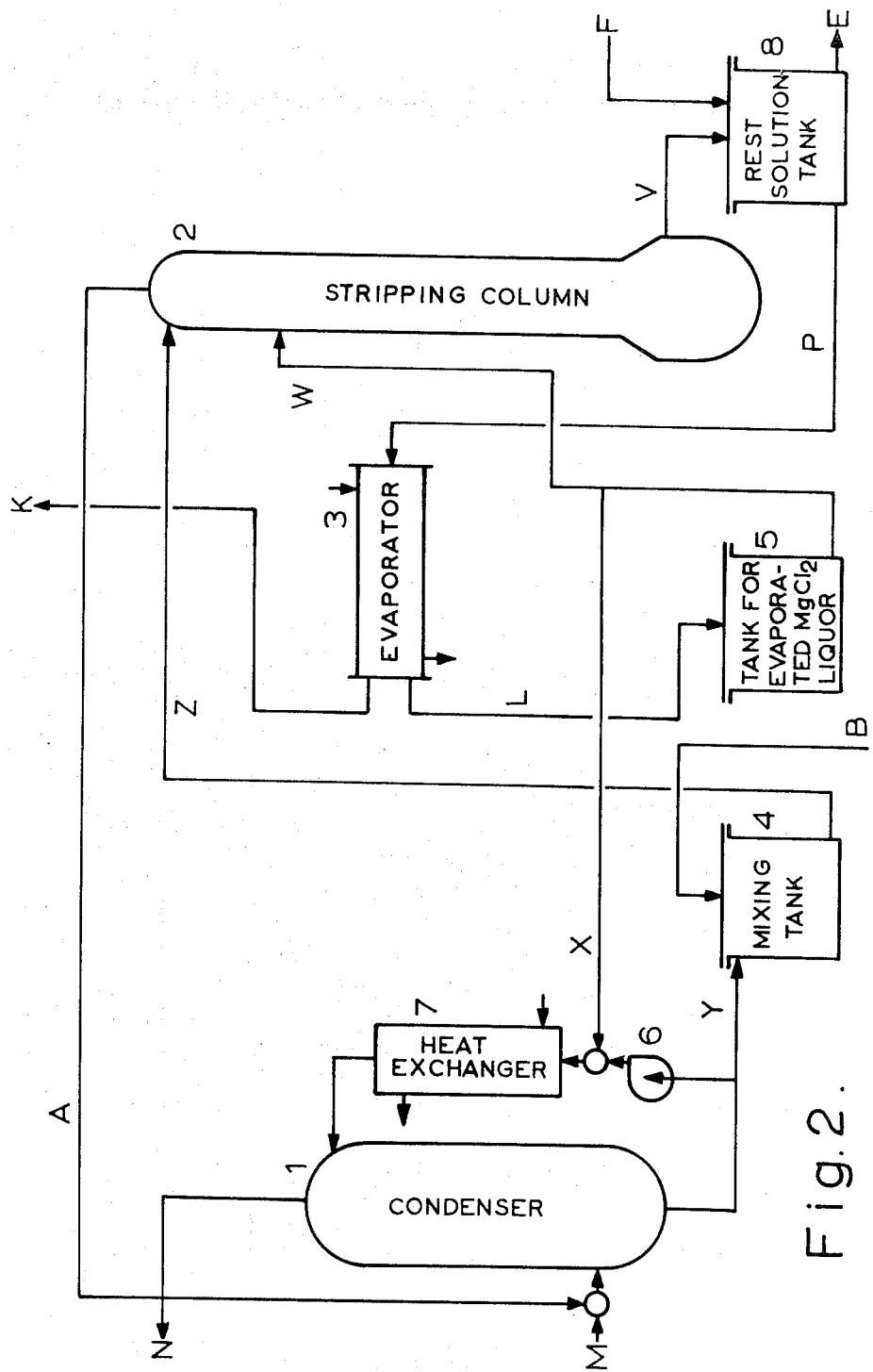

In case a chloride content of the cooling liquid in the condenser 1 is desired, this is advantageously provided by returning part of the rest solution from the evaporator 3. According to the invention this recirculation preferably takes place in one of two ways. These and other features of the process of the invention will become apparent from the more detailed description to be given below in connection with the drawing, in which:

FIG. 1 shows a flow sheet, according to which the process of the invention may be carried out in an advantageous manner, and FIG. 2 shows another flow sheet which also indicates an advantageous embodiment of the process.

In FIG. 1, the reference number 1 means the condenser, e.g., a filled tower or a perforated plate column; 2 is a stripping column, e.g., a perforated plate tower in connection with an external circulation boiler; 3 is an evaporator, e.g., a tube evaporator; 4 is a mixing tank; 6 is a circulation pump; 7 is a heat exchanger (cooler); and 8 is a tank for rest solution from column 2.

In FIG. 2, 5 is a tank for evaporated (concentrated) solution from the evaporator 3. For the rest corresponding members have been given the same reference numbers as in FIG. 1.

The various streams of material are in both flow sheets marked with letters which will be used in the following description to facilitate the understanding.

A preferred embodiment of the invention will now be described more fully, referring to FIG. 1. The hydrous HCl gas M is fed into the condenser 1, preferably to the lower part thereof and is desiccated by contact with the hydrochloric acid optionally containing magnesium chloride, from the cooler 7. A great part of the HCl-saturated liquid from the condenser 1 is recirculated via the cooler 7. One branch stream Y is passed to the mixing tank 4 wherein it is mixed with concentrated magnesium chloride solution L from the evaporator 3. The mixture Z is passed from the mixing tank 4 to the upper part of the stripping column 2, wherein the magnesium chloride solution causes a decrease in the water content of outgoing HCl gas A and a decrease in the HCl content of the rest solution V. The effluent liquid V from the stripping column 2 is passed to the tank 8. This solution contains little HCl. If it is desirable to remove part of this solution from the system to regulate the material balance in regard to dissolved salts, this may advantageously be performed from tank 8, as shown by E. Correspondingly, F indicates a material stream to the system for regulating purposes. From tank 8 the solution P is passed to the evaporator 3, in which water vapour K is stripped off and removed from the system.

If desired, one branch stream X from the mixing tank 4 may be recirculated to the cooler 7 and further to the condenser 1. HCl may additionally be fed into the system, suitably in the mixing tank 4 (indicated by B). Such an additional amount of HCl may suitably be supplied in the form of concentrated hydrochloric acid. Hydrochloric acid may be recovered from the top stream K from the evaporator 3.

Another preferred flow sheet is shown in FIG. 2. This differs from the flow sheet of FIG. 1 in that the rest solution L from the evaporator 3 is passed to the buffer tank 5, from which concentrated solution W is passed to the upper part of column 2. If desired, one branch stream X may be supplied to the cooler 7 ahead of the condenser 1.

An evaluation of the two process alternatives as shown in FIGS. 1 and 2 gave the following result:

The flow sheet according to FIG. 1.

Advantages

It will be appreciated that less equipment is required for this process operation; thus one buffer tank and various other equipment such as pumps and regulators are not required.

Disadvantages

It should be observed that frequently a very narrow temperature range between crystallisation and boiling in the mixing tank 4 is established. Normally, it will be necessary to reduce the magnesium chloride concentration in the mixing tank 4 towards the concentration range where $H_2O$—HCl form an azeotrope, which may cause an increase in the HCl losses in the stripping column 2 at a given column height, or that the stripping column must be built higher (with the same loss of HCl as at a higher $MgCl_2$ concentration). As used here, loss of HCl means HCl which is carried with the residual solution to the tank 8.

The flow sheet according to FIG. 2.

Advantages

A uniform composition of the top product A from the stripping column 2 is readily ensured. Feed HCl Z is here not admixed with evaporated magnesium chloride solution L. Therefore, it is less probable that HCl (in gas phase) will be lost via the ventilation system of tank 4, due to the interval between the crystallisation temperature and the boiling point being wider.

Further, one is not limited by the magnesium chloride content of the mixing tank 4 in the operation of stripping column 2, because evaporated magnesium chloride is added in such a ratio that the desired and required composition of the liquid in the lower part of the stripping column is achieved.

An analysis of the content of the mixing tank 4 and the buffer tank 5 will be more simple, because simple methods of analysis based on specific gravity measurements will be sufficient.

Disadvantages

The essential disadvantage in this process operation is the possibility that evaporated solution may solidify in the pipeline leading to the stripping column 2 and/or the buffer tank 5. This may occur if the evaporation is carried too far. A degree of evaporation resulting in a solution of about 40 percent by weight of $MgCl_2$ will generally not give any problems. A higher degree of evaporation may be used if the tank 5 and the pipeline system are heated.

According to the invention, preferably 0–10 percent by weight of $MgCl_2$ is used in the hydrochloric acid solution fed to the condenser 1 for the removal of moisture from HCl gas obtained by the dehydration of magnesium chloride in the presence of HCl. The preferred content of $MgCl_2$ is in the range 0–2 percent by weight, since it is then easy to avoid crystallisation of $MgCl_2$ hydrate in the heat exchanger 7 when a very dry HCl product N is required, such as a product having a water content of 0.5 percent by volume, corresponding to about 0.25 percent by weight (cfr. Table 1). However, the process of the invention can well be carried out with more than 10 percent by weight of $MgCl_2$ in the condenser liquid (cfr. e.g., Experiment No. 6 in Table 1). Theoretically, one may go up to about 40 percent by weight of $MgCl_2$. However, due to crystallisation and difficulties resulting therefrom, in practice the amount will be kept well below this limit.

As will be appreciated by those skilled in the art, it will, as the case may be, be found advantageous to use other chlorides than $MgCl_2$ in the condenser liquid. The same will be the case for the liquid introduced into the stripping column 2. Further, if the branch stream X is omitted and instead chloride is added from an external source to replace chloride carried with the branch stream Y, there will be another salt composition in the right hand part of the system (column 2 etc.) than in the lefthand part thereof (condenser 1 and cooler 7 etc.). It is preferred to use $MgCl_2$ in a concentration of about 30% by weight in the stripping column 2, calculated on the mixture in the column itself (as far as FIG. 2 is concerned, this means the mixture below the inlet level of the streams Z and W). Suitably, the concentration may be lower than 30 percent, but it has been shown that it must be higher than 20 percent by weight in order to obtain a satisfactory operation of the column 2, with a low loss of HCl to the rest liquid. Moreover, it has been shown that a concentration significantly above 35 percent by weight is likely to cause crystallisation in pipelines and in the tank 8.

The intended effect of the chloride addition is to increase the ratio of the volatility of HCl to that of $H_2O$, which is known *per se*. It is also known that instead of $MgCl_2$ it is possible to use $CaCl_2$, $ZnCl_2$, LiCl and the like for this purpose.

The hydrochloric acid fed to the condenser 1, can at a given moisture content of the desiccated HCl gas N have a higher temperature when the hydrochloric acid contains dissolved chloride than without chloride. Preferably, it is operated within the temperature range 10°–70° C, the preferred temperature range being 20°–40° C. The temperature is selected with regard to the water content of the product gas N, heat economy, temperature of the available cooling water etc.

In practice cases may occur where sufficiently cold cooling water or other cooling medium for use in the cooler 7 is not cheap or readily available, and it will then be of importance that the capacity of cooler 7 can be efficiently utilized. According to the invention one may advantageously use a plate column as condenser for this purpose, since this permits a relatively low degree of recirculation of the liquid and, accordingly, more favourable heat transfer conditions in the cooler 7. Such a low liquid circulation through the cooler 7 will, as compared with the larger liquid circulation, require a lower inlet temperature for the liquid fed to the condenser 1 and at the same time provide a higher temperature of the liquid leaving the condenser and thereby a lower HCl concentration and a lower load on the column 2, etc.

In the following there will be presented in table form various data from practical experiments in operating the present process in accordance with the flow sheet of FIG. 1. Table 1 shows data relating to the condensation stage 1, Table 2 shows data relating to the stripping column 2, and Table 3 shows data relating to the evaporator 3. The experiments, being numbered from 1 to 9, relate to a semi-industrial processing of HCl gas which had been used for dehydrating magnesium chloride. The used HCl gas was desiccated during continuous operation and HCl was recovered according to the present invention. The composition and feed rate of the moist HCl inlet gas was different in the various tests, as stated in Table 1.

TABLE 1 — CONDENSATION STAGE

| Experiment No. | M Total kg./h. | M H$_2$O kg./h. | M H$_2$O percent by volume | M+A Total kg./h. | M+A H$_2$O percent by volume | Condensor Liquid phase bottom °C | Condensor Percent by weight HCl | Condensor Percent by weight MgCl$_2$ | Condensor Temp. of liquid, top | Condensor Temp. of outgoing gas | N (dry HCl gas) Total kg./h) | N H$_2$O percent by volume | N Inert gas (air) percent by volume |
|---|---|---|---|---|---|---|---|---|---|---|---|---|---|
| 1 | 227.3 | 14.07 | 11.6 | 236.9 | 15.39 | 72 | 15.4 | 11.22 | 62 | 67 | 220 | 4.0 | * |
| 2 | 294.8 | 5.90 | 3.97 | 300.2 | 4.35 | 36 | 39.5 | 0.1 | 29.5 | 31.5 | 290 | 0.50 | 2.2 |
| 3 | 322.9 | 5.8 | 3.60 | 328.7 | 3.70 | 36 | 38.8 | 0.4 | 28.5 | 32.0 | 320 | 0.55 | 2.9 |
| 4 | 329.4 | 7.0 | 4.15 | 334.8 | 4.18 | 35 | 40.0 | 0.06 | 27.5 | 30 | 325 | 0.42 | 2.8 |
| 5 | 349.2 | 5.9 | 3.4 | 354.3 | 3.67 | 36 | 38.8 | 0.2 | 29.0 | 32 | 345 | 0.52 | 2.4 |
| 6 | 349.4 | 10.81 | 6.05 | 361.4 | 7.12 | 60 | 25.4 | 11.7 | 57 | 57 | 348 | 2.37 | * |
| 7 | 369.1 | 5.5 | 3.08 | 375.7 | 3.15 | 36 | 39.0 | 1.26 | 29.5 | 32 | 368 | 0.43 | 1.3 |
| 8 | 360.1 | 4.6 | 2.60 | 367.1 | 3.0 | 40 | 36.0 | 4.35 | 34.5 | 36.5 | 360 | 0.60 | 1.0 |
| 9 | 375.3 | 5.2 | 2.80 | 381.3 | 2.9 | 46 | 31.2 | 8.7 | 4.1 | 44 | 375 | 1.0 | * |

Note: Per cent by volume of H$_2$O means per cent by volume of H$_2$O based on the components HCl + H$_2$O
* Not measured.

TABLE 2 — STRIPPING COLUMN

| Experiment No. | Z (feed) Total kg./h. | Z Percent by weight HCl | Z Percent by weight MgCl$_2$ | Boiler Liquid | Boiler Vapour | Top | Pressure mm. Hg. top | A (product) Total kg./h. | A H$_2$O kg./h. | A Percent by volume H$_2$O | V (bottom product) Total kg./h. | V Percent by weight MgCl$_2$ | V Percent by weight HCl |
|---|---|---|---|---|---|---|---|---|---|---|---|---|---|
| 1 | 65.5 | 7.95 | 26.24 | 118 | 118 | 107 | 50 | 9.6 | 4.58 | 65.0 | 55.9 | 31.35 | 0.33 |
| 2 | 49.5 | 12.4 | 25.0 | 118 | 111 | 85 | 65 | 6.0 | 0.57 | 17.5 | 43.5 | 28.4 | 1.80 |
| 3 | 60.0 | 10.2 | 24.0 | 122 | 112 | 70 | 93 | 5.8 | 0.21 | 7.0 | 54.2 | 30.4 | 1.1 |
| 4 | 56.0 | 10.3 | 27.3 | 122 | 112 | 65 | 110 | 5.4 | 0.14 | 5.0 | 50.6 | 32.2 | 1.1 |
| 5 | 48.0 | 11.1 | 25.9 | 121 | 113 | 85 | 117 | 5.1 | 0.47 | 17.0 | 42.9 | 29.3 | 1.9 |
| 6 | 76.5 | 13.0 | 23.6 | 122 | 112 | 95 | 50 | 12.0 | 2.55 | 35.5 | 64.5 | 30.2 | 0.84 |
| 7 | 59.0 | 11.7 | 26.7 | 123 | 114 | 78 | 175 | 6.6 | 0.41 | 12.0 | 52.4 | 29.6 | 1.4 |
| 8 | 59.0 | 11.8 | 26.2 | 122 | 114 | 68 | 154 | 7.0 | 0.21 | 6.0 | 52.0 | 29.3 | 2.0 |
| 9 | 65.0 | 11.2 | 27.1 | 122 | 113 | 70 | 210 | 6.0 | 0.21 | 7.0 | 56.5 | 28.9 | 2.5 |

TABLE 3 — EVAPORATOR

| Experiment No. | P (feed) Total kg./h. | P Percent by weight MgCl$_2$ | P Percent by weight HCl | Temperature °C Feed (P) | Liquid separator liquid | Liquid separator vapour | < H (evaporated solution) Total kg./h. | < H Percent by weight MgCl$_2$ | < H Percent by weight HCl |
|---|---|---|---|---|---|---|---|---|---|
| 1 | 45.5 | 31.0 | 0.35 | 50 | 155.5 | 141 | 29.6 | 47.6 | * |
| 2 | 44.0 | 28.8 | 1.68 | 83 | 146 | 135 | 28.0 | 45.3 | 0.11 |
| 3 | 71.0 | 30.3 | 1.37 | 86 | 147 | 138 | 47.6 | 45.2 | 0.05 |
| 4 | 79.5 | 31.3 | 1.19 | 90 | 147 | 135 | 59.0 | 42.2 | 0.05 |
| 5 | 60.0 | 30.3 | 1.33 | 91 | 147 | 138 | 42.0 | 43.2 | 0.04 |
| 6 | 70.0 | 31.2 | 0.90 | 81 | 147 | 139 | 48.75 | 44.8 | * |
| 7 | 82.0 | 29.6 | 1.63 | 0 | 144 | 127 | 54.0 | 44.9 | 0.10 |
| 8 | 62.0 | 29.4 | 1.63 | 92 | 146 | 135 | 42.1 | 43.2 | 0.11 |
| 9 | 65.0 | 29.5 | 1.70 | 93 | 146 | 138 | 41.8 | 43.8 | 0.09 |

* Not measured.

In the following there will be given some comments on the above experiments:

a. In Table 1 the inert gases are included in the data indicating the gas quantities. In the columns stating percent by volume of H$_2$O the inert gases are ignored, the interest for the water content being primarily connected with the total of HCl and H$_2$O, cfr. the note in Table 1.

b. As appears from Table 1, very satisfying results were obtained. In most of the experiments the HCl gas is substantially anhydrous. A water content of 0.4 percent by volume corresponds to about 0.2 percent by weight.

c. The lowest moisture of the feed gas (M+A) in the experiments is 2.9 percent by volume and the highest one 15.39 percent by volume. The process of the invention can, however, be used with good results even if the water content of the feed gas is far outside this range, e.g., at 20 to 30 percent by volume of H$_2$O.

d. Since the HCl content of the rest solution from condensation stage 1 decreases with increasing chloride content, the load on the stripping column 2 will be somewhat influenced. A too high chloride content in the condensation stage may cause a crystallisation when particularly strict requirements are set up with respect to the dryness of the gas, since a high chloride content requires a low temperature in the condensation stage.

e. The loss of HCl in the bottom product V from the stripping column 2 will depend on the magnesium chloride concentration and the height of the column, and one must here consider the technical as well as the economic aspects regarding stable and safe operation, costs of investment and operation. However, as to order of magnitude, the stream of material V may contain a few tenths of one percent by weight of HCl.

What is claimed is:

1. A process for recovering substantially anhydrous HCl gas from hydrous HCl gas obtained by dehydrating magnesium chloride in a HCl atmosphere, which hydrous HCl gas contains up to 20 percent by weight of $H_2O$ based on the total weight of HCl and $H_2O$, which comprises introducing the hydrous HCl gas into the lower portion of a condenser, bringing the gas in direct counter-current contact with an aqueous HCl solution having a strength above that of the azeotropic composition and being provided by recirculating a portion of the liquid effluent from the bottom portion of the condenser through a heat exchanger in which the recirculated effluent is cooled to a temperature between 10° and 70° C and then introduced into the top portion of the condenser, withdrawing the anhydrous HCl gas from the top portion of the condenser, withdrawing the liquid effluent from the bottom portion of the condenser and introducing a portion of the effluent into a stripping column to strip HCl-rich gas by extractive distillation from a liquid mixture containing aqueous HCl and, dissolved therein, a salt selected from the group consisting of $MgCl_2$, $CaCl_2$, $ZnCl_2$ and LiCl in an amount providing a ratio of volatility of HCl to $H_2O$ at least equivalent to that provided by 20 percent by weight of $MgCl_2$, recirculating the stripped HCl-rich gas to the process ahead of the condenser, evaporating the liquid effluent from the stripping column to remove water from the system and returning the resultant liquid to the process.

2. The process according to claim 1, wherein the aqueous HCl solution fed to the condenser contains $MgCl_2$ in an amount of 0–10 percent by weight.

3. The process according to claim 1, wherein the aqueous HCl solution fed to the condenser contains $MgCl_2$ in an amount of 0–2 percent by weight.

4. The process according to claim 1, wherein the aqueous HCl solution is fed to the condenser at a temperature of 20°–40° C.

5. The process according to claim 1, wherein the concentration of $MgCl_2$ used in the stripping column is about 30 percent by weight, calculated on the mixture in the column.

6. The process according to claim 1, wherein the liquid from the evaporation stage is mixed with effluent from the condenser and a portion of the mixture is fed to the stripping column.

7. The process according to claim 6, wherein the remaining portion of the mixture is fed to the condenser.

8. The process according to claim 1, wherein a portion of the liquid from the evaporation stage is fed directly to the stripping column.

9. The process according to claim 8, wherein the remaining portion of the liquid is fed to the condenser.

* * * * *